United States Patent Office 3,701,738
Patented Oct. 31, 1972

3,701,738
CHEMILUMINESCENT IMPROVEMENTS
Bernard George Roberts, 13 Harstrom Place, Rowayton, Conn. 06853, and Michael McKay Rauhut, 7 Douglas Drive, Norwalk, Conn. 06850
No Drawing. Continuation of application Ser. No. 866,383, Oct. 14, 1969, which is a continuation-in-part of application Ser. No. 577,596, Sept. 7, 1966. This application Apr. 29, 1971, Ser. No. 138,799
Int. Cl. C09k 3/00
U.S. Cl. 252—188.3       5 Claims

ABSTRACT OF THE DISCLOSURE

A superior chemiluminescent composition for providing visible light, the composition containing (1) a bis-derivative of a polycarbonyl compound of the formula:

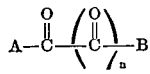

where A and B are organic groups to form an ester, an amide, an anhydride, or an O-acylhydroxylamine, (2) a peroxide, (3) a solvent, and (4) rubrene as a fluorescer.

---

This is a continuation of our copending application Ser. No. 866,383, filed Oct. 14, 1969 which is a continuation-in-part of our previously filed application Ser. No. 577,596, filed Sept. 7, 1966, now abandoned.

The present invention relates to a novel chemiluminescent combination of ingredients which when reacted with a hydroperoxide obtains a quantum yield, a maximum intensity, and a total yield of chemiluminescent light which are of a significantly greater degree than chemiluminescent processes employing prior chemiluminescent compositions. More particularly, this invention relates to an improvement in the ester compositions of oxalic-type compounds which is the subject matter of application Ser. No. 491,896, filed Sept. 30, 1965, now abandoned and refiled as U.S. application Ser. No. 619,-140. By "chemiluminescent light" as referred to herein is meant electromagnetic radiation at wavelengths falling between about 350 m$\mu$ and about 800 m$\mu$.

The invention relates to the employment of a particular fluorescent compound and of a particular organic solvent in combination with specifically an oxalic-type ester of the type referred to above.

In the earlier stages of chemiluminescence research the low efficiency and the low maximum intensity of light obtainable from even the best of the known chemiluminescent systems was of such a poor quality, i.e., such a small illumination, that the advantage or superiority of one fluorescent compound over other possible fluorescent compounds was not significant in terms of the illumination obtained by the use thereof. For example, the better fluorescent compounds differed from the poorer fluorescent compounds merely by a matter of about 3 or 4 units in quantum yield. Similarly, except to the extent that a chemiluminescent material was soluble in a diluent at least to the extent of obtaining chemiluminescent light upon the reaction with an appropriate peroxide compound, there was no recognition of any appreciable or significant superiority of any one particular solvent over other solvents known to be suitable in chemiluminescent systems in general. Even as some improvements developed in the chemiluminescent materials themselves, there still existed problems as to which solvents could be employed with particular chemiluminescent materials, and the fact that only by experimentation could it conclusively be ascertained that certain combinations were compatible. For example, it would "not" be possible to employ dimethyl phthalate as the solvent for the oxalyl chloride-hydrogen peroxide chemiluminescent combination that additionally included the fluorescer rubrene because the rubrene would quickly react to obtain a product which would no longer give chemiluminescent light. Also, among the various fluorescent compounds known to be effective in chemiluminescent reactions, there became available conflicting evidence as to the probable superiority of one fluorescent compound over another. Additionally, the particular nature of the chemiluminescent agent to be employed as well as the particular nature of the fluorescent compound to be employed, respectively, may each vary in solubility in the particular solvent to be employed, thereby further complicating any effort to predict the superiority of any projected combination of chemiluminescent ingredients.

It is an object of this invention to obtain a chemiluminescent composition which obtains a higher quantum yield of light than has heretofore been possible, when admixed with a hydroperoxide.

Another object of this invention is to obtain a process for the product of chemiluminescent light as a quantum yield higher than heretofore had been possible.

Another object of this invention is to obtain a chemiluminescent composition which when admixed with a hydroperoxide obtains a higher maximum intensity of light than had heretofore been possible with prior chemiluminescent compositions.

Another object of this invention is to obtain a process which produces a chemiluminescent light of a higher maximum intensity than heretofore had been possible with prior chemiluminescent processes.

Another object is to obtain a chemiluminescent composition which obtains a higher total light yield than had heretofore been possible with prior chemiluminescent compositions.

Another object is to obtain a process for the production of a higher total quantity of light than heretofore had been possible with prior chemiluminescent processes.

Another object of this invention is to obtain an article of manufacture suitable for storage of the chemiluminescent composition and/or employment with the chemiluminescent composition in a chemiluminescent reaction.

Other objects of the invention become apparent from the above and following disclosure.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means "reacting" or sufficiently bringing together component reactants to obtain a chemiluminescent reaction.

The term "diluent," as used herein means a solvent or a vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

We have unexpectedly discovered that the objects of this invention are obtained by the reaction of the hydroperoxide with a chemiluminescent composition which, in combination, comprises a chemiluminescent compound of the formula:

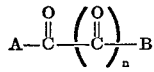

wherein $n$ is an integer of at least one, and A and B are organic groups such that the chemiluminescent compound is one selected from the group consisting of (1) an oxalic-type anhydride of the type disclosed and claimed in a copending application U.S. Ser. No. 425,599, filed Jan. 14, 1965, now abandoned and refiled as U.S. application Ser. No. 485,920, now issued as U.S. Pat. No. 3,399,137, which is hereby incorporated by reference, (2) an oxalic-type amide of the type disclosed and claimed in copending applications U.S. Ser. No. 520,052, filed Jan. 12, 1966, and U.S. Ser. No. 547,782, filed May 5, 1966, which are hereby incorporated by reference, (3) an oxalic-type O-acylhydroxylamine of the type disclosed and claimed in copending application Ser. No. 547,761, filed May 5, 1966, and (4) an oxalic-type ester, a rubrene-type compound, and a solvent selected from the group consisting of an ester solvent, an ether solvent, and an ether-ester solvent. The preferred combination of this invention critically requires the employment of an oxalic-type ester as the essential chemiluminescent ingredient of the novel combination of this invention, and accordingly the entire disclosure of copending application Ser. No. 491,896, filed Sept. 30, 1965, now abandoned and refiled as U.S. application Ser. No. 619,140, is hereby incorporated by reference. Therefore, oxalic-type esters within the scope of this invention include esters of the following representative formula:

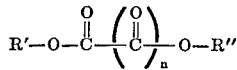

where R' or R" is an alkyl group such as decyl-, or a substituted alkyl group, such as chloromethyl-, or carboxymethyl-, or methyl(phenyl sulfonyl)aminoethyl-, pyridylethyl-, sulfomethyl-, aryl substituents such as phenyl-, or naphthyl- for example, or substituted aryl groups such as chlorophenyl-, benzoyloxyphenyl-, formylphenyl-, carboxyphenyl-, methoxyphenyl-, acetylaminophenyl-, pyridylphenyl-, sulfophenyl-, heterocyclic groups such as pyridyl-, or substituted forms of heterocyclic groups such as methylpyridyl-, chloropyridyl-, acetoxypyridyl-, formylpyridyl-, carboxypyridyl-, methoxyfuryl-, dimethylaminotetrahydrofuryl-, sulfofuryl-, for example, and unsaturated alkyl groups such as vinyl-, for example. Other representative oxalic-type esters of alcohols include compounds such as esters with diols, such as ethyl-glycol, cyclic ether with diols such as pyrocatechol, polymeric esters with diols such as resorcinol, esters with alcohols which are fluorescent, such as 2-naphthol-3,6,8-trisulfonic acid.

Once the unexpected superiority was discovered for the combination of this invention which includes the oxalic-type ester chemiluminescent compound, it immediately became apparent to the inventors that because of similarity in the chemistry mechanism of reactions, the oxalic-type anhydrides, the oxalic-type amide, and the oxalic-type O-acylhydroxylamine of the types set forth in the above cited copending applications incorporated by reference may be employed in substitution for the preferred oxalic-type ester.

Because of the sensitivity of rubrene and rubrene-type-compounds to light, it is advantageous to avoid subjecting the combination of this invention to light radiation prior to a chemiluminescent reaction. Accordingly, the composition comprising the combination may be placed into a suitable non-translucent container which may be opened, dissolved, or crushed at the time that it is desired to admix therewith a hydroperoxide to obtain chemiluminescent light. For example, an opaque frangible or fragile capsule may be employed. Alternatively, an opaque capsule may be employed whichw hen placed in an appropriate peroxide, or solvent, or solution of a peroxide will dissolve, whereby chemiluminescence will take place.

It is known in the art that inferior chemiluminescent intensities and lifetimes are obtained from the chemiluminescent reaction of oxalyl chloride, hydrogen peroxide and various fluorescent compounds in diethyl ether than are obtained in dimethylphthalate solution. One might therefore expect that chemiluminescent intensities and lifetimes obtained from the chemiluminescent reaction of oxalate esters with hydrogen peroxide and fluorescent compounds would likewise be inferior when carried out in ether solvents. Unexpectedly, however, we find that quite high chemiluminescent intensities and long lifetimes can be obtained when oxalate esters are reacted with hydrogen peroxide in the presence of fluorescers in such ether-type solvents as 1,2-dimethoxyethane, 1,2-dibutoxyethane, 2-ethyloxyethyl acetate, and the like.

It is known in the art that the fluorescer rubrene provides superior chemiluminescent intensities relative to the fluorescer 9,10-diphenylanthracene when used in the chemiluminescent reaction of oxalyl chloride and hydrogen peroxide in ether solution. It is also known that dimethylphthalate when used as solvent for the oxalyl chloride-hydrogen peroxide-9,10-diphenylanthracene chemiluminescent reaction provides superior intensities and lifetimes to those obtained when ether is employed as solvent. Thus, one might except that the combination oxalyl chloride-hydrogen peroxide-rubrene in dimethylphthalate would be the superior chemiluminescent system involving oxalyl chloride. However, in practice this is not found to be the case. Thus, rubrene is found to be unsuitable in the oxalyl chloride-hydrogen peroxide-rubrene-dimethylphthalate system, and very poor chemiluminescent intensities and yields are obtained. One might thus predict that the chemiluminescent combination of an oxalate ester, hydrogen peroxide, and rubrene in an ester solvent such as the dimethylphthalate would provide poor results. Actually we find that exceptionally high intensities are obtained.

Accordingly, the oxalic-type ester of this invention is preferably selected from the group consisting of (a) an ester of oxalic-type acid and an alcohol characterized by acid ionization constant in water greater than $1.3 \times 10^{-10}$, and (b) a vinyl ester of an oxalic-type acid. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis(2-nitrophenyl)oxalate,
bis(2,4-dinitrophenyl)oxalate,
bis(2,6-dichloro-4-nitrophenyl)oxalate,
bis(3-trifluoromethyl-4-nitrophenyl)oxalate,
bis(2-methyl-4,6-dinitrophenyl)oxalate,
bis(1,2-dimethyl-4,6-dinitrophenyl)oxalate,
bis(2,4-dichlorophenyl)oxalate,
bis(2,5-dinitrophenyl)oxalate,
bis(2-formyl-4-nitrophenyl)oxalate,
bis(pentachlorophenyl)oxalate,
bis(1,2-dihydro-2-oxo-1-pyridyl)glyoxal,
bis-N-phthalimidyl oxalate, and
bis(2,4,6-trichlorophenyl)oxalate.

The preferred sub-species are bis(2,4-dinitrophenyl)oxalate and bis(2,4,6-trichlorophenyl)oxalate.

The rubrene-type compound of the novel combination of this invention may be rubrene or may alternatively be any substituted form of rubrene such as (a) alkyl substituents containing from about one to about eight carbon atoms, (b) chlorine, (c) fluorine, (d) carboxy, (e) alkoxy, and (f) aryloxy, for example. In the following representative structural formula of rubrene, the positions suitable for substitution have been arbitrarily numbered from 1 through 28, to illustrate that the rubrene may be substituted at any one or more of these positions by a substituent such as those listed above.

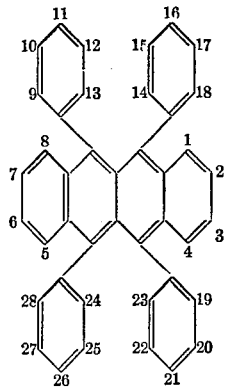

The preferred rubrene-type compound is rubrene.

The typical solvents employable as a necessary ingredient for a chemiluminescent process employing the chemiluminescent combination of this invention include the conventional simple-ester solvents such as dimethyl phthalate, dibutyl phthalate, ethyl acetate, octyl acetate, dimethyl adipate, triethyl phosphate, tricresyl phosphate, ether-ester solvents such as 2-methoxyethyl acetate, and the ether solvents such as 1,2-dimethoxyethane, ethylene carbonate, 1,2-di-butoxyethane (i.e. dibutyl Cellosolve), propylene carbonates, and dibutyl Carbitol. Typical ether solvents include tetrahydrofuran, and dioxane. It should be noted that there are other solvents which are non-ether-ester which also may be employed; such as benzene, xylene, toluene, and the like. These specific examples are merely listed as illustrative specific compounds.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed. Although the presence of water and/or base is critical in order to obtain the preferred optimum maximum-intensity chemiluminescence in certain embodiments of this invention, the peroxide employed may be obtained from anhydrous hydrogen peroxide compounds such as perhydrate of urea (urea peroxide), perhydrate of pyrophosphate (sodium pyrophosphate peroxide), perhydrate of histidine (histidine( histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively dissolved directly in a solution containing the peroxide reactant.

Typical diluents which additionally may be used in conjunction with the necessary diluent of this invention are those which do not readily react with a peroxide such as hydrogen peroxide, and which do not react with an ester of oxalic acid.

Although the addition of water is not necessary for the production of chemiluminescent light in certain embodiments according to the present invention water can serve as the diluent or partial diluent. The term "water," as used herein, includes water-producing compounds such as hydrates. In addition, however, either one or more diluents may be included with or in the place of the water, as long as the peroxide employed is at least partially soluble in the diluent(s), such as, for example, at least $\frac{1}{10}$ gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

Although rubrene-type compounds are necessary in the novel combination of this invention, other fluorescent compounds may be employed therewith.

The compounds contemplated herein, which may, if desired, be employed in conjunction with rubrene or a rubrene-type compound may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc. New York, N.Y., 1949. Other fluorescers are described in "The Colour Index," Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although the rubrene fluorescent compound is necessary to obtain the production of light of this invention, the fluorescent compound is not necessary to obtain a chemical reaction and chemical energy release. Also, a fluorescent ester such as the oxalic acid ester of 2 - naphthol - 3,6,8 - trisulfonic acid may be employed as the oxalic-type ester in conjunction with the rubrene to obtain the light of this invention. Other typical fluorescent oxalic acid esters include esters of oxalic acid (1) 2 - carboxyphenol, (2) 2 - carboxy-6-hydroxyphenol, (3) 1,4 - dihydroxy - 9,10 - diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-7}$ to 5 molar, preferably in the range of at least about $10^{-3}$ to about 1 molar; the fluorescent compound is present in the range from about $10^{-5}$ to 5, preferably $10^{-4}$ and $10^{-1}$ molar; and the water or other diluent must be present in a sufficient amount to form at least a partial solution of the reactants involved in the chemiluminescent reaction. There is no known maximum limit on the concentration of ester employed in the reaction. The ester may serve as either the sole diluent or a partial diluent.

The ingredients of the composition of this invention may be admixed in a single stage of admixing or in a sequence of steps of admixing the separate ingredients.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about $-40°$ C. and $75°$ C., preferably between about $20°$ C. and $50°$ C.; however, the luminescence of applicants' process is not limited to these ranges. However, temperature is not critical.

Additionally, the composition and the process which obtains preferred optimum chemiluminescent light intensity employs a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being; sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; etc.

The composition and the process which obtains chemiluminescent light may optionally employ an acid in an amount sufficient to produce an acidic pH. However, the presence of acid is not essential to obtain chemiluminescence, except with compounds of copending U.S. Ser. No. 547,782.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

(4) By the addition of a catalyst which changes the rate of reaction of hydroperoxide with the oxalic-type ester. Catalysts which accomplish that objective include those described in M. L. Bender, "Chem. Revs.," Vol. 60, p. 53 (1960). Also, catalysts which alter the rate of reaction or the rate of chemiluminescence include those accelerators of application Ser. No. 577,595, abandoned June 13, 1967, and refiled as application Ser. No. 675,141 (application Ser. No. 813,864 was filed as a continuation-in-part application of application Ser. No. 675,141) and decelerators of application Ser. No. 577,615, filed Sept. 7, 1966, now abandoned and refiled as application Ser. No. 648,932.

More specifically, the advantages obtained by the incorporation of a catalyst of Ser. No. 577,595, filed Sept. 7, 1966, now abandoned and refiled as U.S. application Ser. No. 675,141, may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above about 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed, in contrast to systems not employing the accelerator whereby such systems would be limited to a much lower maximum concentration of chemiluminescent agent which would continue to increase rather than decrease the total quantum yield of chemiluminescent light.

Similarly, within the scope of the present invention is the concurrent employment of one or more decelerators either alone in the composition of this invention, or in conjunction with one or more of the accelerators discussed in the preceding paragraphs. By employing one of the accelerators of the preceding paragraph, it would be possible to embploy a greater total concentration of the chemiluminescent agent while concurrently would be possible to employ a decelerator which would prolong the period during which the light of high intensity is obtained from the chemiluminescent reaction. Such decelerators set forth in the copending application Ser. No. 577,615, now abandoned and refiled as U.S. application Ser. No. 648,932 include, for example, a compound such as oxalic acid.

The following examples are intended to illustrate the present invention and are in no way intended to limit the invention except to the extent that the appended claims are limited.

EXAMPLE I

Prior to discussing the actual experiment of this Example I, it is first necessary to discuss the reason for the experiments, and the practical theory involved. The following discussion provides the basis upon which it could be expected by the skilled artisan in the field of chemiluminescence that both 9,10-diphenyl anthracene (a fluorescent compound) and 4-butylamino-1,8-N-butylnaphthalimide (a fluorescent compound) would be superior fluorescers as compared to rubrene, in a chemiluminescent system. In contrast thereto, the novel combination of applicants' invention employing rubrene is much superior to the other fluorescent compounds when employed in combination with the same (similar) oxalic ester and the same (similar) solvent of applicants' invention.

(A) Luminosity relationships for practical chemical lighting.—The requirements for a practical chemical lighting system are necessarily dictated by a particular application. For any given lighting application, however, it is clear that a practical system must provide light that exceeds a minimum intensity level for a specified length of time. The intensity and duration of chemical lighting systems are related to their capacity by Equation 1.

(1) 
$$L=\int_{T=0}^{T=\infty} \frac{IdT}{3600V}$$

In Equation 1, L is the light capacity in lumen-hours liter$^{-1}$, I is the visual intensity in lumens, T is the time in seconds and V is the volume of the system in liters.

Thus L defines the amount of light a system can deliver and is a fundamental criterion for practical chemical lighting. A system where L is below some specified level cannot be made to meet the required intensity-time performance for a given application.

The factors that determine the light capacity of a chemiluminescent system are illustrated by Equation 2.

(2) $L=4.07\times10^4 QMP$

In Equation 2 L is the light capacity in lumen-hours liter$^{-1}$, Q is the quantum yield in Einsteins mole$^{-1}$, M is the concentration of limiting reactant in moles liter$^{-1}$, and P is the photoptic luminosity factor (defined below) which is determined by the shape and location of the emission spectrum and compares the eye's ability to see the emitted light with the eye's ability to see (yellow) line emission at 555 m$\mu$, where the eye is most sensitive. The factor $4.07\times10^4$ defines the eye's ability to see radiation at 555 m$\mu$ and has the units lumen-hours einstein$^{-1}$.

The photoptic luminosity factor, P, Equation 2 takes into account the variation in the human eye's sensibility to light with varying wavelength. The human eye is most responsive to yellow light at 555 m$\mu$, and the eye's sensitivity decreases rapidly as the wavelength departs from 555 m$\mu$ toward the blue or the red ends of the visual spectrum. Thus a given amount of radiation is twice as bright at 555 m$\mu$ as at 510 m$\mu$ or 610m$\mu$ and is essentially not seen below 400 m$\mu$, the threshold to the ultraviolet or above 700 m$\mu$, the threshold to the infrared.

P is calculated in terms of the spectral sensitivity factor, S defined by Equation 3.

(3) 
$$S=\frac{\int_{\lambda_1}^{\lambda_2} I_l^T \lambda}{\int_{\lambda_1}^{\lambda_2} I_e^T \lambda}$$

In Equation 3, S has the units lumen-seconds Einsteins$^{-1}$, $\lambda_1$ and $\lambda_2$ are the wavelength limits of the spectral distribution, $I_l^T$ is the entensity at wavelength $\lambda$ in lumens, and $I_e^T$ is the intensity at wavelength $\lambda$ in Einsteins sec.$^{-1}$. The integrals thus represent the integrated light intensity in lumen-seconds and in einsteins over the spectral distribution. It is, of course, necessary for the validity of this calculation that the emission spectral distribution remains constant throughout the chemiluminescent process and that the two integrals be determined from the same spectral data obtained at a given reaction time. Thus an experimental measurement is made of intensity vs. wavelength for a chemiluminescent reaction with a calibrated radiometer-spectrofluorimeter and the intensities are corrected to a given point of time by application of the concurrently measured reaction decay curve. The observed intensity at each wavelength is then multiplied by the instrument calibration factors, and converted respectively to lumens and to einsteins sec.$^{-1}$ by the corresponding conversion factors appropriate to each wavelength.

The spectral sensitivity factor, S, can vary from zero for a system that emits ultraviolet or infrared radiation to which the eye is insensitive to a value of $1.51\times10^8$ lumen-seconds Einstein$^{-1}$ [$4.07\times10^4$ lumen-hours Einstein$^{-1}$] for a system where all of the emission is at 555 m$\mu$. The spectral sensitivity factor is thus a major element in determining the light capacity of a chemiluminescent system.

Since it is convenient to express the eye's ability to see the radiation in a spectral distribution as a percentage of the eye's ability to see radiation at 555 m$\mu$, photoptic constants, P, are therefore defined in terms of the spectral sensitivity factor S and the spectral sensitivity factor for line emission at 555 m$\mu$ in Equation 4.

(4) 
$$P=\frac{S}{4.07\times10^4}$$

It is clear that the photoptic luminosity factor can vary from zero to one, depending on the shape and location of the emission spectrum.

(B) The general mechanism for chemiluminescence can be broken down into three steps.[1-6]

(1) Luminant+oxidant→key intermediate
(2) Key intermediate→excited singlet fluorescer
(3) Excited singlet fluorescer→fluorescer+radiation In step (1) a chemiluminescent material undergoes reaction, usually with an oxidant, to produce what we will call a key intermediate. In step (2) the key intermediate undergoes a decomposition or other reaction which produces a fluorescent compound in a singlet excited step. In step (3) the excited singlet fluorescer emits radiation. As in any consecutive process the overall efficiency of chemiluminescence will be the product of the yields of the three separate steps. It is clear that each step must be efficient for the overall process to be efficient.

Step (3) in an efficient chemiluminescent reaction is substantially identical to the radiative process in fluorescence. Thus, barring an excitation energy transfer to a second fluorescer, the spectral distribution of emission from the chemiluminescent reaction will be identical to the fluorescence spectral distribution of the emitter. Moreover, the yield of light from step (3) will be the fluorescence quantum yield for the emitting species.

It is clear from the mechanism that the chemiluminescence quantum yield (Q) will be given by Equation 5.

(5) $Q=K\times(FlQ)$

In Equation 5, Q is the chemiluminescence quantum yield in Einsteins of light per mole of reactant, K is the product of the yields in steps (1) and (2) of the mechanisms and (FlQ) is the fluorescence quantum yield of the emitter, that is the yield of step (3).

Substituting Equation 5 into Equation 2 we obtain Equation 6.

(6) $L=4.07\times10^4 K(FlQ)MP$

According to Equation 6 the light capacity of a chemiluminescent system will depend on both the fluorescence quantum yield (FlQ) and the luminosity of the spectral distribution (P) of the fluorescent emitter, as well as the chemical efficiency of excited state formation (K) and the luminescent concentration (M).

(C) In principle one might expect to be able to predict the effect of a fluorescer in the oxalate ester-hydrogen peroxide-fluorescer chemiluminescent reaction in advance of experiment by using Equations 5 and 6. Thus, both (FlQ) and P can be determined independently of chemiluminescence experiments, the ester concentration M can be selected at will, and the chemical yield K might be expected to be independent of the fluorescer. If this latter requirement were met, then the chemical yield, K, could be calculated according to Equation 7 from a chemiluminescent measurement with one fluorescer, and then used to predict chemiluminescence quantum yield and light capacity for the reaction with other fluorescers according to Equations 5 and 6.

(7) $K=Q/(FlQ)$

We find, however, that such predictions cannot, in fact, be made. In particular the fluorescer rubrene, we find, gives far superior chemiluminescence in terms of quantum yield and in terms of light capacity than would be predicted from Equations 5 and 6, respectively.

(D) The experiments.—This unexpected superiority found for rubrene is illustrated by the results in Table I.

All the experiments in Table I were carried out (admixed) with 0.01 molar bis(2,4-dinitrophenyl)oxalate, 0.05 molar hydrogen peroxide, and $6 \times 10^{-4}$ molar fluorescer in dimethylphthalate solvent at 25° C. Only the fluorescer was changed as indicated in the table.

TABLE I

| Fluorescer | F/Q | P | Q (Einstein/mole)$\times 10^2$ Calc. | Q (Einstein/mole)$\times 10^2$ Found | L, lumen-hrs./liter Calc. | L, lumen-hrs./liter Found |
|---|---|---|---|---|---|---|
| a. 9,10-diphenylanthracene | 0.84 | 0.04 | | 8.2 | | 1.34 |
| b. 4-butylamino-1,8-N-butylnaphthalimide | 0.53 | 0.71 | 5.2 | 5.7 | 15.0 | 16.5 |
| c. Rubrene | 0.30 | 0.67 | 2.9 | 18.2 | 7.9 | 49.7 |

Thus, Example I illustrates that the combination of this invention, rubrene in conjunction with a solvent such as dimethyl phthalate and an oxalic ester obtains unexpectedly superior results as compared to other fluorescent compounds in the same sovent and oxalic ester.

EXAMPLE II

This example represents a series of experiments in which the oxalic ester [bis(2,4-dinitrophenyl)oxalate] is admixed with a fluorescent compound and hydrogen peroxide at room temperature to obtain a comparison of various fluorescers in a chemiluminescent system.

The example illustrates the superiority of rubrene as an acceptor, as illustrated in Table II.

TABLE II

| | Bis(2,4-dinitrophenyl) oxalate (moles/liter$^{-1}$) | $H_2O_2$ (moles/liter$^{-1}$) | Rubrene (moles/liter$^{-1}$) | 9,10-diphenyl anthracene (moles/liter$^{-1}$) | 4-butylamino-1,8-N-butyl-naphthalimide (moles/liter$^{-1}$) | $I_{max}$.$^a$ (ft. lamberts) | Quantum yield (Einstein/mole$^{-1}$)$\times 10^2$ | Light capacity (lumen-hours/liter$^{-1}$) |
|---|---|---|---|---|---|---|---|---|
| a | $1\times 10^{-3}$ | $2.4\times 10^{-2}$ | | $6\times 10^{-4}$ | | 0.27 | 16.5 | 0.27 |
| b | $1\times 10^{-3}$ | $5\times 10^{-2}$ | $6.3\times 10^{-4}$ | | | 9.0 | 21.2 | 6.78 |
| c | $1\times 10^{-2}$ | $2\times 10^{-2}$ | | | $1\times 10^{-3}$ | 17.4 | 5.6 | 16.1 |
| d | $1\times 10^{-2}$ | $2\times 10^{-2}$ | | $5\times 10^{-3}$ | | 0.7 | 7.9 | 1.28 |
| e | $1\times 10^{-2}$ | $2\times 10^{-2}$ | | | $4.2\times 10^{-3}$ | 15.6 | 5.7 | 16.5 |
| f | $1\times 10^{-2}$ | $2.4\times 10^{-2}$ | $6\times 10^{-4}$ | | | 809.8 | 18.3 | 49.9 |
| g | $1\times 10^{-2}$ | $5\times 10^{-2}$ | | $6\times 10^{-4}$ | | 1.9 | 7.6 | 1.23 |
| h | $1\times 10^{-2}$ | $5\times 10^{-2}$ | $6.8\times 10^{-4}$ | | | 196.0 | 16.1 | 43.9 |
| i | $1\times 10^{-2}$ | $1\times 10^{-1}$ | | | $1\times 10^{-3}$ | 0.9 | 7.1 | 1.16 |
| j | $1\times 10^{-2}$ | $1\times 10^{-1}$ | $1\times 10^{-3}$ | | | 57.0 | 10.0 | 27.3 |

$^a$ Maximum intensity.

Example II, Experiments (a) and (b) illustrate that at identical concentrations of the oxalic ester, and at substantially identical hydrogen peroxide concentrations, in dimethylphthalate solvent, rubrene is the superior chemiluminescent fluorescer in combination with this system in all categories (1) maximum intensity, (2) quantum yield, and (3) total light output (light capacity).

Experiments (c), (d), (e), and (f), similarly illustrate the superiority of rubrene in the combination at similar concentrations as compared with both 9,10 - diphenyl anthracene and 4-butylamino-1,8-N-butylnaphthalimide.

Experiments (g) and (h) illustrate the employment of higher concentrations of hydrogen peroxide, in which rubrene remains the superior fluorescer.

Experiments (i) and (j) illustrate greatly reduced concentrations of both hydrogen peroxide and of the fluorescent compounds, in which rubrene continues to be highly superior to other fluorescers.

EXAMPLE III

This Example III procedure is the same as Example I, and illustrates quantum yield of chemiluminescence from dinitrophenyl oxalate-$H_2O_2$-rubrene reaction.[1] Ingredients are merely admixed at room temperature. The results are illustrated in Table III.

TABLE III

| | Bis(2,4-dinitrophenyl)-oxalate (moles/liter$^{-1}$)[4][5] | $H_2O_2$ (moles/liter$^{-1}$) | T ¼[1] (min.) | T ¾[2] (min.) | $I_{max}$.[3](ft. lamberts) | Quantum yield (Einstein/mole$^{-1}$)$\times 10^2$ | Light capacity, lumen hours/liter$^{-1}$ |
|---|---|---|---|---|---|---|---|
| a | $1\times 10^{-3}$ | $5\times 10^{-3}$ | 27.4 | 47.8 | 1.68 | 25.4 | 6.93 |
| b | $1\times 10^{-3}$ | $5\times 10^{-2}$ | 5.1 | 5.1 | 9.1 | 21.2 | 5.78 |
| c | $1\times 10^{-2}$ | $2.4\times 10^{-2}$ | 1.1 | 2.3 | 195.6 | 18.3 | 49.9 |
| d | $1\times 10^{-2}$ | $4.8\times 10^{-2}$ | 1.4 | 5.1 | 278.6 | 18.2 | 49.6 |

[1] Time required for the light intensity to decrease to ¼ of its maximum value.
[2] Time required for three-quarters of the total light emission.
[3] Maximum intensity.
[4] Solvent used was dimethyl phthalate.
[5] Rubrene concentration $6\times 10^{-4}$.

Table III discloses that, in comparing Experiments (a) and (b), an increase in the hydrogen peroxide by tenfold had a major effect on the maximum intensity which increased by about fivefold, and on the T¼ and T¾, the T¼ decreasing by about 80% and the T¾ decreasing about 85%. Experiment (d) in comparison with Experiment (b) illustrates that an increase in concentration of the oxalic ester by about tenfold increases maximum intensity by about thirtyfold and reduces T¼ by about 70%, and also increases light capacity by about eight- or ninefold. A comparison of Experiments (c) and (d) illustrate the effect by doubling the hydrogen peroxide concentration, whereby maximum intensity is increased without any appreciable effect on T¼, quantum yield, and light capacity (total light output), but more than doubled the T¾.

EXAMPLE IV

In Example IV, a comparison of rubrene was made with 9,10-diphenyl-anthracene (DPA) as a fluorescer for oxalate ester-hydrogen peroxide chemiluminescence.

The reactions each included 0.01 molar oxalate ester with 0.025 molar hydrogen peroxide and $8\times 10^{-4}$ molar fluorescer (except Exp. 3) at 25° C.

The solvent DMP is dimethylphthalate; TEP is triethylphthalate.

The $I_{max}$ is the maximum intensity in a 1.0 cm. deep cell.

---
[1] Solvent used was dimethyl phthalate. Rubrene concentration was $6\times 10^{-4}$.

The T¼ L is the time required for the intensity to decay to one-quarter of its maximum value.

The Q stands for quantum yield.

The L stands for light capacity.

The fluorescer concentration in Exp. 3 was $5.0 \times 10^{-3}$ molar.

TABLE IV

| Exp. | Ester | Solvent | Fluorescer | $I_{max.}$ (ft. lamberts) | T¼ L (min.) | Q (Einstein/mole$^{-1} \times 10^{-2}$) | L (lumen hrs./liter$^{-1}$) |
|---|---|---|---|---|---|---|---|
| 1 | Bis(2-methyl-4,6-dinitrophenyl)oxalate | DMP | Rubrene | 181 | 1.5 | 17.4 | 47.5 |
|   |   |   | DPA | 0.6 | 2.0 | 7.1 | 1.2 |
| 2 | Bis(3-trifluoromethyl-4-nitrophenyl)oxalate | TEP | Rubrene | 2.8 | 165 | 22.0 | 60.0 |
|   |   |   | DPA | 0.4 | 26 | 7.2 | 1.2 |
| 3 | Bis(2-formyl-4-nitrophenyl)oxalate | DMP | Rubrene | 7.4 | 36 | 14.4 | 39.3 |
|   |   |   | DPA | 0.2 | 89 | 8.7 | 1.4 |

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as limited in the following claims. Also, it is within the scope of this invention to form an apparatus or article such as a container which, for example, may be either (1) a substantially insoluble or alternatively (2) a dissolvable capsule in which the reactant or composition of this invention is substantially enclosed for subsequent reaction with other ingredients necessary to produce chemiluminescent light.

What is claimed is:

1. A chemiluminescent composition for reaction with a hydroperoxide to obtain chemiluminescent light, said composition comprising (1) an ester of the formula:

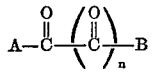

where A and B represent moieties selected from the group consisting of (a) anhydride, (b) amide, (c) O-acylhydroxylamine, and (d) aliphatic or aromatic groups, and $n$ is an integer at least one, (2) rubrene and substituted derivatives thereof and (3) an organic solvent, said ingredients being present in sufficient concentration to obtain chemiluminescence when reacted with said hydroperoxide.

2. A composition according to claim 1, in which said ester is a bis ester of oxalic acid and an aromatic alcohol substituted by a substituent characterized by a positive Hammett sigma value, and said fluorescent compound comprises rubrene, and said solvent comprises a dialkyl phthalate in which the alkyl substituents contain from one to about eight carbon atoms.

3. A composition according to claim 2, in which said bis ester of oxalic acid comprises bis(2,4 - dinitrophenyl) oxalate, in which said dialkyl phthalate comprises dimethyl phthalate, and including a minor amount of base sufficient to obtain an alkaline pH, a catalyst of the type which affects the rate of reaction of a hydroperoxide with an oxalic-type ester, and an excessive amount of said bis-(2-nitrophenyl)oxalate.

4. A process of reacting hydrogen peroxide with the composition according to claim 3.

5. A process of reacting a hydroperoxide with the composition according to claim 1.

References Cited
UNITED STATES PATENTS 3,311,564    3/1967    Cline _____ 252—188.3

JOHN D. WELSH, Primary Examiner

U.S. Cl. X.R.

252—186